C. ADAMS.
Car-Brakes.
No. 154,112.
Patented Aug. 18, 1874.
FIG I
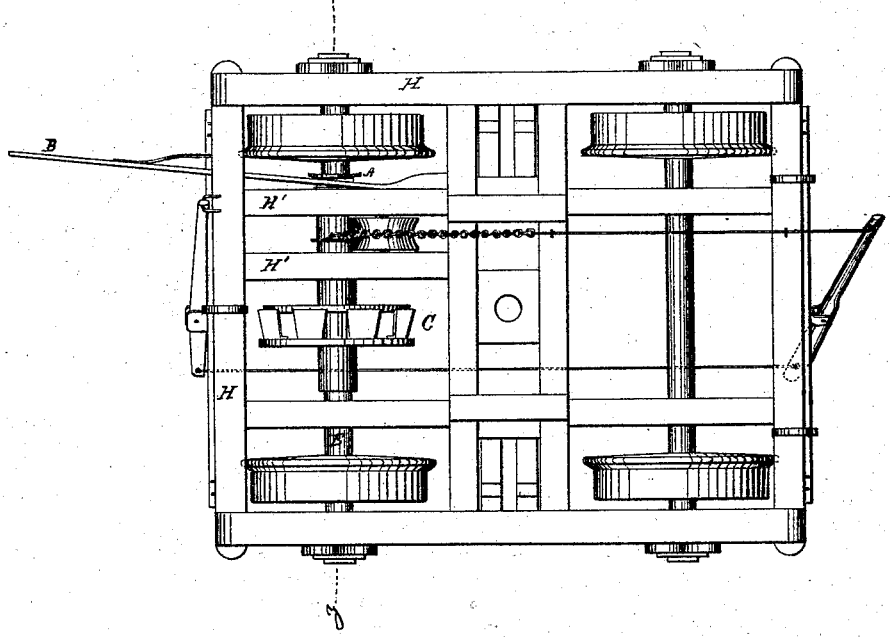
FIG II
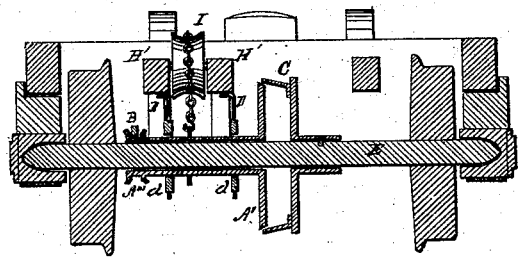
WITNESSES
INVENTOR
Chas. Adams
per atty.
Evans Comstock & Co.

UNITED STATES PATENT OFFICE.

CHARLES ADAMS, OF MINNEAPOLIS, MINNESOTA.

IMPROVEMENT IN CAR-BRAKES.

Specification forming part of Letters Patent No. 154,112, dated August 18, 1874; application filed May 15, 1874.

*To all whom it may concern:*

Be it known that I, CHARLES ADAMS, a resident of the city of Minneapolis, county of Hennepin and State of Minnesota, have invented certain new and useful Improvements in Reactionary Car-Brakes, of which the following is a full, clear, and exact description.

Figure 1 is a top view of a car-truck, showing my invention as applied. Fig. 2 is a transverse center sectional view, taken through the line *x y*, Fig. 1.

The object of my invention is to produce a simple, durable, and effective reactionary car-brake that shall, while receiving its power from the rotations of a car-axle in either direction, produce no strain whatever upon said axle that would be likely to make it less durable or strong.

Letter E shows a car-axle, to which is firmly attached the clutch-cylinder C. Letters H' are longitudinally-placed timbers in the truck-frame H, their province being to support the clutch-drum A by the intermediate aid of the downwardly-projecting brackets D, and the vertically-adjustable bearing *d* of the drum A. The inner end of the drum A' is beveled, as shown in Fig. 2, to correspond with the counter-bevel of the cylindrical clutch C, the line of bevel used being that which would most easily engage and disengage, together with the requisite amount of power required thereof. Letter A''' shows an annular groove cut in the outer end of the drum A. This groove admits of a suitable bearing for the purpose of producing a reciprocating motion of the drum A by the lever B. Letter I shows a grooved wheel, hung immediately over the drum A, with its outer edge in line with the center of said drum. The wheel I is used to guide the chain in its passage from the drum to the brake-lever, as shown in Fig. 1.

Letter B shows a lever, attached at its inner end to the transom of the truck H, its center passing over, under, or around the outer end of the drum A, engaging in the annular groove therein, the lever B extending outwardly from said drum that its outer end may be connected with a counter-lever or other suitable device that shall extend within working reach of the brakeman.

The object of the lever-connection B' is, that a reciprocating movement of the drum A may be produced, so that a person standing on the top or platform of a car may engage or disengage the said drum from the cylinder-clutch C, engaging or disengaging the car-brakes thereby.

The drum A is hollow, and encircles the car-axle E, the hole passing longitudinally through said drum, with its diameter enough greater than that of the car-axle to allow of the entire freedom of said axle therein.

The drum A and clutch-cylinder C may be made in halves that they may be attached to said axle without removing the car-wheels therefrom.

The drum A is held in its required position by the vertically-adjustable bearings *d*, said bearings being held in position by the brackets D of the timbers H' H', (see Fig. 2,) making thereby the support of said drum independent of the car-axle.

The connecting brake-lever chain is attached at its inner end to the drum A by a link or eyebolt.

When it is needed to put the brakes in operation, the outer end of the lever B is forced inwardly, forcing the beveled end of the drum A in the correspondingly-beveled clutch-cylinder C, said clutch engaging the drum with the amount of frictional power applied, winding the chain around the drum, and pressing thereby the brake-shoes against the face of the car-wheels by the aid of the connecting brake-bars, levers, and chains.

It must be evident from the above description of my invention that my device can be applied to any kind of a carriage, wagon, or car.

Your petitioner is aware that other devices having the same end in view have been invented, but is not aware, so far as his knowledge extends, that he conflicts with said other devices.

Having thus described my invention, what I claim, and want to secure by Letters Patent, is—

1. The drum A, in combination with the projecting brackets D and adjustable bearings *d*, substantially as and for the purpose set forth.

2. The drum A, in combination with the clutch-cylinder C, bearing *d*, and lever B, all constructed to operate substantially as and for the purpose set forth.

CHARLES ADAMS.

Witnesses:
W. W. GETCHELL,
FRED W. BELL.